United States Patent [19]
Kline

[11] Patent Number: 6,115,922
[45] Date of Patent: Sep. 12, 2000

[54] PUNCH PLIERS DEVICE FOR CUTTING J-CHANNEL SIDING ELEMENTS

[76] Inventor: Keith Kline, 16453 Sharp Rd., Rockton, Ill. 61072

[21] Appl. No.: 08/954,195

[22] Filed: Oct. 20, 1997

Related U.S. Application Data

[63] Continuation-in-part of application No. 08/556,500, Nov. 13, 1995, Pat. No. 5,678,367.

[51] Int. Cl.⁷ ....................................................... B26B 13/26
[52] U.S. Cl. .................................. 30/229; 30/252; 52/211
[58] Field of Search ............................. 30/229, 233, 252, 30/254, 286; 72/325, 326; 83/917

[56] References Cited

U.S. PATENT DOCUMENTS

| | | | |
|---|---|---|---|
| 591,999 | 10/1897 | Carter | 30/229 |
| 964,600 | 7/1910 | Adams | 30/229 |
| 2,138,726 | 11/1938 | Cartwright | 30/173 |
| 2,520,905 | 9/1950 | Borrelli | 30/251 |
| 2,595,841 | 5/1952 | Glick et al. | 30/229 |
| 2,603,864 | 7/1952 | Neola | 30/229 |
| 2,612,686 | 10/1952 | Wagner | 30/287 |
| 2,751,681 | 6/1956 | Hillson | 30/229 |
| 2,806,325 | 9/1957 | Fox | 30/173 |
| 3,393,595 | 7/1968 | Halverson et al. | 30/229 |
| 3,395,724 | 8/1968 | Hamel | 72/323 |
| 3,628,247 | 12/1971 | Lattin | 30/233 |
| 4,124,937 | 11/1978 | Gaughf, Jr. | 83/917 |
| 4,177,664 | 12/1979 | Sports | 72/326 |
| 4,637,084 | 1/1987 | Wood | 30/254 |
| 5,440,812 | 8/1995 | Nishizuka | 30/286 |
| 5,483,746 | 1/1996 | Beyers | 30/229 |
| 5,544,416 | 8/1996 | Lin | 30/252 |
| 5,715,604 | 2/1998 | Lanzoni | 30/252 |

*Primary Examiner*—M. Rachuba
*Attorney, Agent, or Firm*—David J. Archer

[57] ABSTRACT

A punch pliers device is disclosed for cutting J-channel used for fastening siding around an opening defined by a building. The device includes a first U-shaped member having a first and a second arm. A second U-shaped member has a first and a second limb, the second member being pivotally secured to the first member such that in a first disposition of the members relative to each other, the arms and the limbs define therebetween an opening for the reception therein of the J-channel. When the members are pivoted relative to each other to a second disposition thereof, at least some of the arms and the limbs cut through the J-channel such that subsequent bending of the J-channel to fit around the opening is permitted.

22 Claims, 8 Drawing Sheets

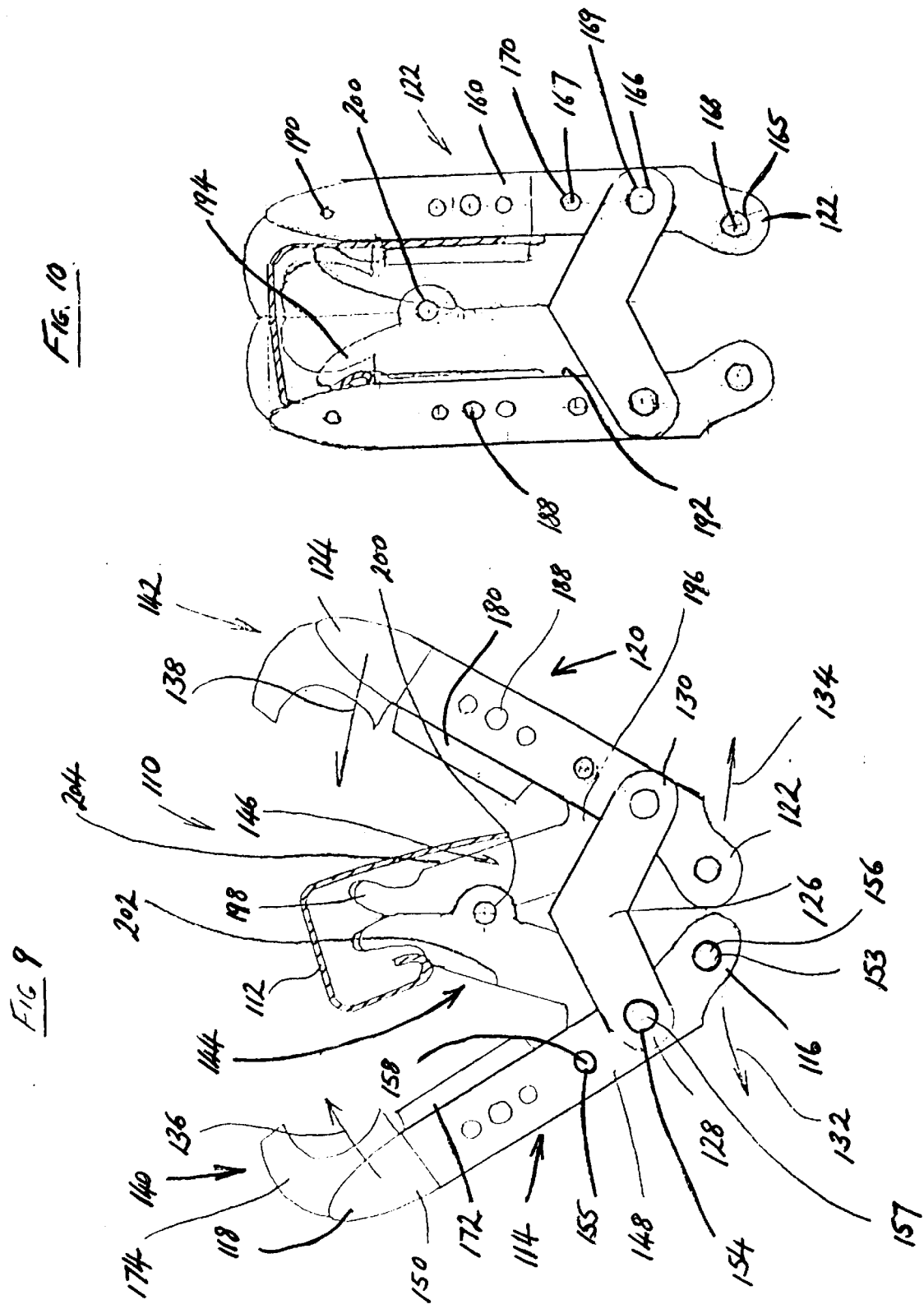

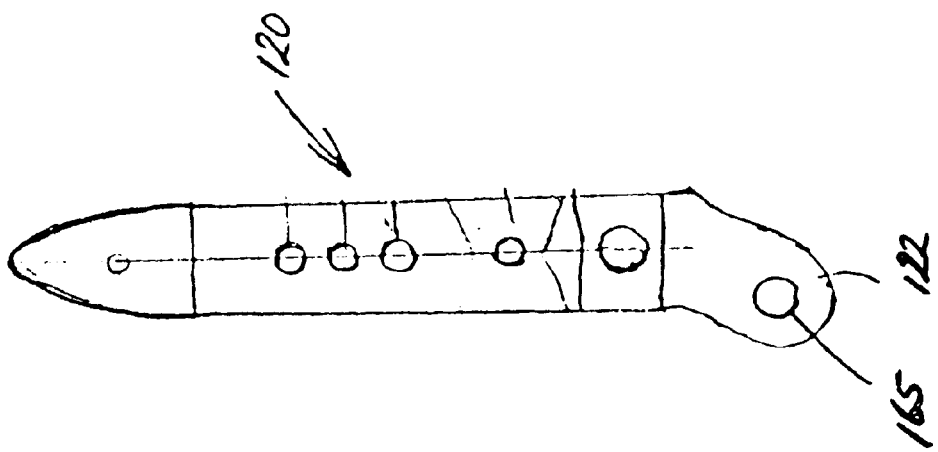
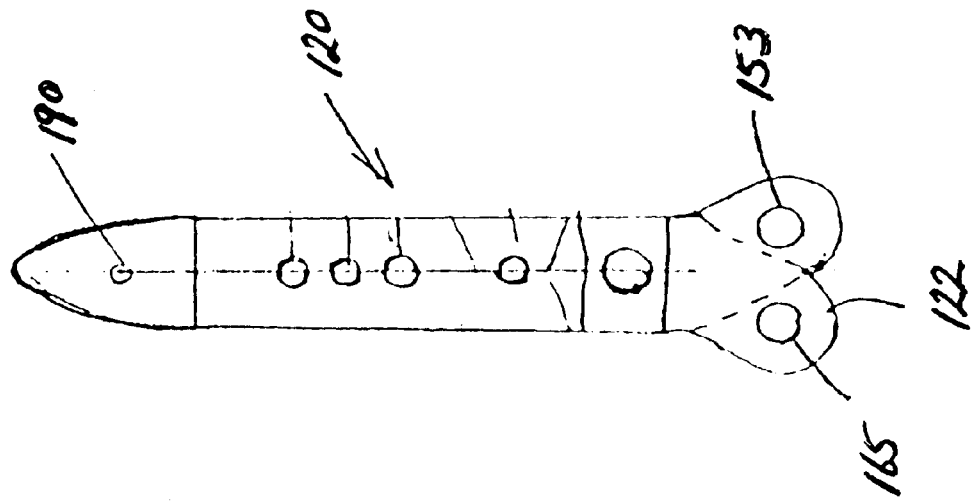

PUNCH PLIERS DEVICE FOR CUTTING J-CHANNEL SIDING ELEMENTS

CROSS REFERENCE TO RELATED APPLICATION

This is a continuation-in-part of application(s) Ser. No. 08/556,500 filed on Nov. 13, 1995.

The subject application is a continuation-in-part of Applicant's application U.S. Ser. No. 08/556,500 filed Nov. 13, 1995 now U.S. Pat. No. 5,678,367. All the disclosure of U.S. Ser. No. 08/556,500 is incorporated herein by reference.

BACKGROUND OF THE INVENTION

1. Field of the Invention

The present invention relates to a punch pliers device for fastening J-channel siding around an opening defined by a building. More specifically, the present invention relates to a fastening tool or punch pliers for facilitating installation of such J-channel elements and to the cutting of J-channel elements.

2. Information Disclosure Statement

Vinyl siding enables the transformation of a building to present an aesthetic appearance thereto and to protect the building against the elements.

However, although the application of vinyl siding to an unobstructed external wall of a building is relatively straight forward, the application of such siding around windows and doors and the like have proved to be labor intensive thereby increasing the overall cost of the siding operation.

The present invention drastically reduces the time taken to install J-channels around an opening such as a window or the like.

Also, according to the present invention, the co-operating J-channels secured around an opening such as a window present a particularly pleasing appearance when the siding has been locked therein.

Therefore it is a primary objective of the present invention to provide a punch pliers device for fastening siding around an opening defined by a building and for enabling an operator to secure such siding in considerably less time than permitted by the prior art arrangements.

Another object of the present invention is the provision of a punch pliers device for facilitating the installation of J-channels having an improved aesthetic appearance.

Another object of the present invention is the provision of a J-channel elements which appear to be mitered relative to each other.

Another object of the present invention is the provision of a punch pliers device for cutting a J-channel used for fastening siding around an opening defined by a building.

Other objects and advantages of the present invention will be readily apparent to those skilled in the art by a consideration of the detailed description contained hereinafter taken in conjunction with the annexed drawings.

SUMMARY OF THE INVENTION

The present invention relates to a punch pliers device for cutting J-channel used for fastening siding around an opening defined by a building. The device includes a first U-shaped member having a first and a second arm.

A second U-shaped member has a first and a second limb. The second member is pivotally secured to the first member such that in a first disposition of the members relative to each other, the arms and the limbs define therebetween an opening for the reception therein of the J-channel. When the members are pivoted relative to each other to a second disposition thereof, at least some of the arms and the limbs cut through the J-channel such that subsequent bending of the J-channel to fit around the opening is permitted.

In a more specific embodiment of the present invention, the first arm and the second limb are bifurcated such that when the members are pivoted to the second disposition thereof, the first arm and the second limb cut through the J-channel with cuts that are disposed generally angularly relative to each other.

More particularly, the first member further includes a base portion defining a hole. The second member also includes a main portion which defines an aperture, the aperture and the hole being aligned relative to each other. A pivot pin extends through the hole and the aperture for permitting the members to pivot relative to each other.

The first arm extends from the base portion and includes, a distal portion and a proximal portion disposed between the distal portion and the base portion. The second limb extends from the main portion and includes an extremity portion and an intermediate portion disposed between the extremity portion and the main portion.

The distal portion is bifurcated and includes a first and a second curved portion. Also, the extremity portion is bifurcated and includes a first and a second backing portion.

The first member further includes a first and second cutting blade secured to the first and second curved portions respectively.

Additionally, the second member further includes a first and second shear element secured to the first and second backing portions respectively.

More specifically, the second cutting blade and the second shear element define an arc.

The second arm includes a hook portion and the first limb includes a hook shaped portion. The hook portion and the hook shaped portions are disposed within the J-channel when the device is in the first disposition thereof. The hook portion and the hook shaped portion support the J-channel and urge the J-channel towards the second limb and the first arm respectively when the members are pivoted towards the second disposition thereof.

More particularly, the hook portion urges the J-channel towards the first and second shear elements and the hook shaped portion urges the J-channel towards the first and second cutting blades respectively when the members are moved from the first towards the second disposition thereof for cutting through the J-channel.

The second arm also includes means for cutting through a fastening portion of the J-channel. Additionally, the first limb further includes a further means for cutting through a fastening portion of the J-channel particularly when the J-channel is reversed.

Also, the intermediate portion further includes an anvil which co-operates with the means for cutting and the proximal portion further includes a further anvil which co-operates with the further means for cutting.

In a preferred embodiment of the present invention, a punch pliers device is provided for cutting J-channel used for fastening siding around an opening defined by a building. The device includes a first elongate cutting member for cutting the J-channel, the first member having a first and a second end. Additionally, a second elongate cutting member is provided for cutting the J-channel, the second member having a first and a second extremity.

A yoke extends between the cutting members, the yoke having a first and a second side. The first side of the yoke is pivotally secured to the first cutting member between the first and second end of the first cutting member. The second side of the yoke is pivotally secured to the second cutting member between the first and second extremity of the second cutting member. The arrangement is such that when the first end and the first extremity are moved away from each other, the second end and the second extremity move towards each other.

A first cutting means is secured to the first cutting member adjacent to the second end of the first cutting member for cutting the J-channel when the J-channel is disposed between the second end and the second extremity.

A second cutting means is secured to the second cutting member adjacent to the second extremity of the second cutting member for cutting the J-channel when the J-channel is disposed between the second end and the second extremity.

A first guide means is pivotally secured to the first cutting member between the first side of the yoke and the second end of the first cutting member for guiding the J-channel towards the first cutting means.

Also, a second guide means is pivotally secured to the second cutting member between the second side of the yoke and the second extremity of the second cutting member for guiding the J-channel towards the second cutting means.

More specifically, the first cutting member includes a main portion which extends from the first end. Also, a first and second bifurcated portion extend from the main portion to the second end.

Additionally, the main portion defines a first, second and a third transverse bore, the bores being disposed parallel relative to each other. A first, second and third pin cooperate respectively with the first, second and third bores such that the first bore and first pin permit leveraged movement of the first end and extremity away from each other. The second bore and second pin permit pivotal movement of the first cutting member relative to the first side of the yoke. The third bore and third pin permit pivotal movement of the first guide means relative to the first cutting member. The first bore is disposed adjacent to the first end of the first cutting member, the second bore being disposed between the first and the third bore.

Also, the second cutting member includes a further main portion which extends from the first extremity. A third and fourth bifurcated portion extend from the further main portion to the second extremity.

The further main portion defines a fourth, fifth and a sixth transverse bore, the bores being disposed parallel relative to each other. A fourth, fifth and sixth pin cooperate respectively with the fourth, fifth and a sixth bores such that the fourth bore and fourth pin permit leveraged movement of the first end and extremity away from each other. The fifth bore and fifth pin permit pivotal movement of the second cutting member relative to the second side of the yoke. The sixth bore and sixth pin permit pivotal movement of the second guide means relative to the second cutting member. The fourth bore is disposed adjacent to the first extremity of the second member, the fifth bore being disposed between the fourth and the sixth bore.

Preferably, the cutting members are metal castings in which the first and fourth bores are cast during a casting of each cutting member, the first and fourth bores being removed from every alternate casting so that opposed pairs of cutting members are generated.

The first cutting means includes a first linear blade secured to the first cutting member. Also, a first curved cutting blade is secured to the first bifurcated portion. Furthermore, a second curved cutting blade is secured to the second bifurcated portion.

Additionally, the second cutting means includes a second linear blade secured to the second cutting member.

Also, a third curved cutting blade is secured to the third bifurcated portion and a fourth curved cutting blade is secured to the fourth bifurcated portion.

Each of the linear blades includes locating means for permitting location and setting of the first linear blade relative to the first cutting member and the second linear blade relative to the second cutting member.

Each of the curved blades includes further locating means for permitting location and setting of the first and second curved blade relative to the first and second bifurcated portion respectively and the third and fourth curved blade relative to the third and fourth bifurcated portion respectively.

The first guide means includes a proximal and a distal end, the proximal end being pivotally secured to the first cutting member. The distal end is bifurcated such that in use of the device, the bifurcated distal end is disposed within the J-channel for urging the J-channel towards and into cutting engagement with the first cutting means.

Also, the second guide means includes a further proximal and a further distal end. The further proximal end is pivotally secured to the second cutting member. The further distal end is bifurcated such that in use of the device, the further bifurcated distal end is disposed within the J-channel for urging the J-channel towards and into cutting engagement with the second cutting means.

Pivotal means extend through the first and second guide means. The pivotal means are disposed between the proximal and distal ends of the guide means for permitting the guide means to be pivotally connected to each other.

Anvil means is disposed between the proximal and the distal ends of the first guide means. The first linear cutter blade is secured to the first cutting member, such that the first linear cutter blade cooperates with the anvil means for cutting the J-channel.

A further anvil means is disposed between the further proximal and the distal ends of the second guide means. The second linear cutter blade is secured to the second cutting member.

The second linear cutter blade cooperates with the further anvil means for cutting the J-channel.

Many modifications and variations of the present invention will be readily apparent to those skilled in the art by a consideration of the detailed description contained hereinafter taken in conjunction with the annexed drawings. However, such modifications and variations fall within the spirit and scope of the present invention as defined by the appended claims.

Included in such modifications would be the use of the inventive concept of the present invention relative to the installation of a L-channel grid system for supporting a drop ceiling grid work.

Also, the punch pliers of the present invention could include a slide permitting the selective insertion of a punch for punching various size J-channels.

BRIEF DESCRIPTION OF THE DRAWINGS

FIG. 9 is a top plan view of the device according to a preferred embodiment of the present invention showing the device in an open first disposition thereof prior to the cutting of the J-channel;

FIG. 10 is a top plan view of the device according to the preferred embodiment of the present invention shown in FIG. 9 but showing the device in an closed second disposition thereof subsequent to the cutting of the J-channel;

FIG. 13 shows how the cutting members of the device shown in FIG. 9 are cast;

FIG. 14 is a similar view to that shown in FIG. 13 but with a bore removed;

Similar reference characters refer to similar parts throughout the various views of the drawings.

DETAILED DESCRIPTION OF THE DRAWINGS

Figure 1:
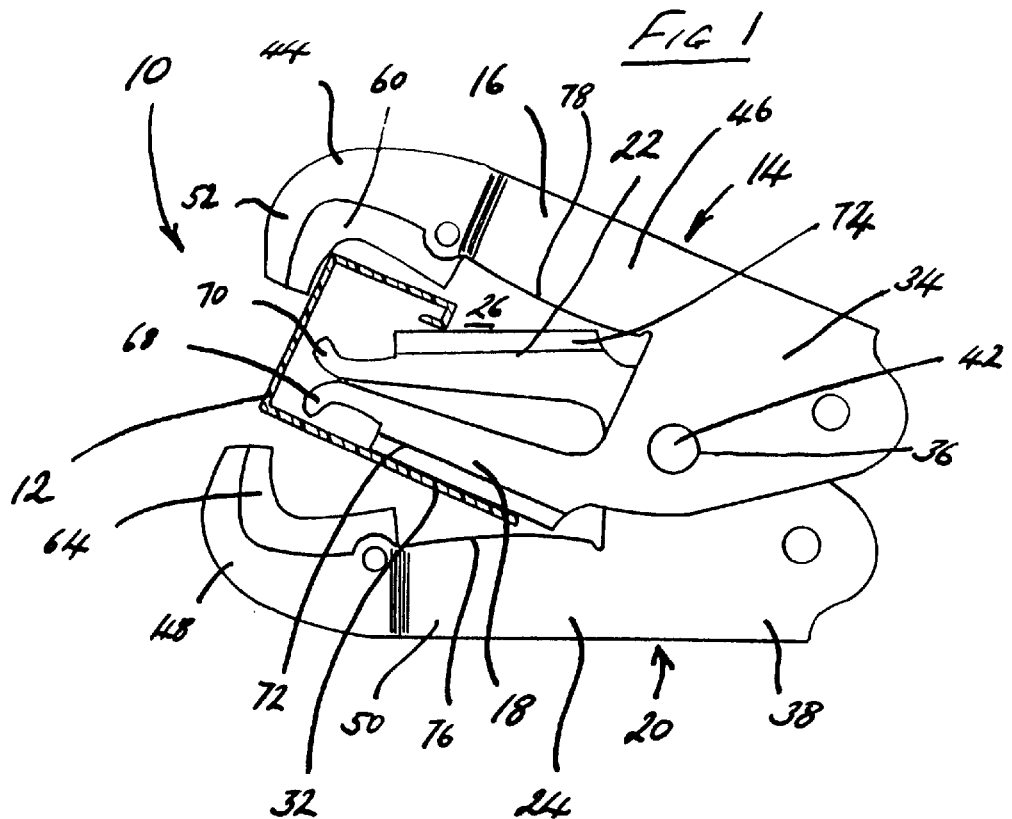
FIG. 1 is a side elevational view partially cut away showing a punch pliers device according to the present invention, in a first disposition thereof, for cutting J-channel for fastening siding around an opening defined by a building.
Figure 8:
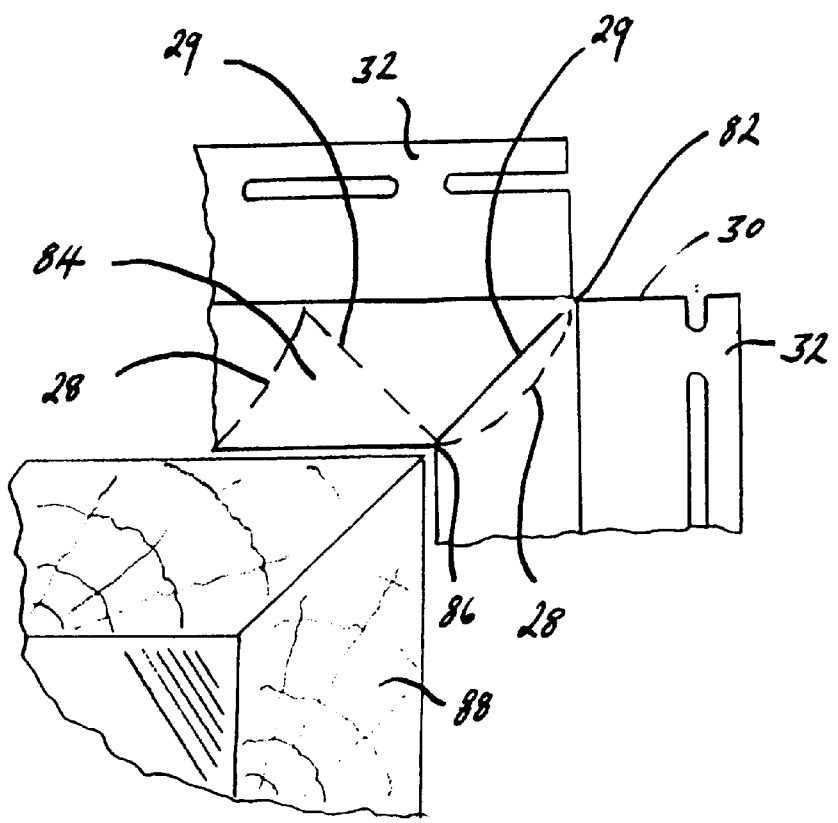
FIG. 8 is a view similar to that shown in FIG. 4 but with the cut J-channel bent to a mitered joint around a window frame.

FIG. 1 is a side elevational view of a punch pliers device generally designated 10. As shown in FIG. 1, the device 10 is used for cutting a J-channel 12 used for fastening siding around a frame 88 of an opening such as a window defined by a building as shown in FIG. 8. The device 10 includes a first U-shaped member generally designated 14 having a first and a second arm 16 and 18 respectively as shown in FIG. 1.

A second U-shaped member generally designated 20 has a first and a second limb 22 and 24 respectively, the second member 20 being pivotally secured to the first member 14 such that in a first disposition of the members relative to each other as shown in FIG. 1, the arms 16, 18 and the limbs 22, 24 define therebetween an opening 26 for the reception therein of the J-channel 12. When the members 14 and 20 are pivoted relative to each other to a second disposition thereof as shown in FIG. 2, at least some of the arms 16 and the limbs 24 cut through the J-channel 12 such that subsequent bending of the J-channel 12 to fit around the opening is permitted as shown in FIG. 8.

Figure 2:
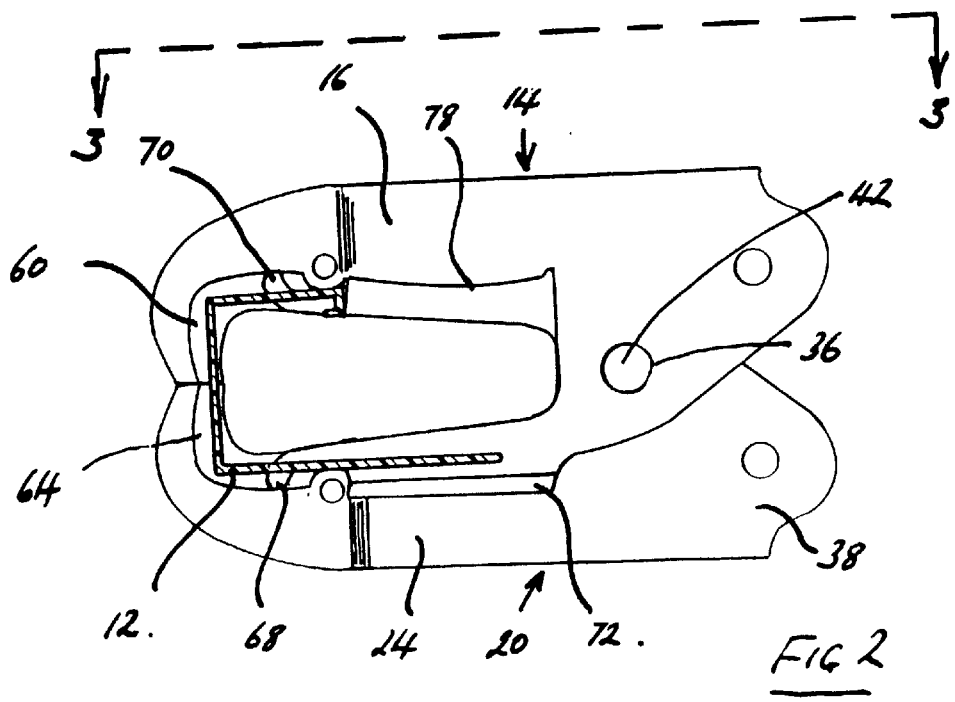
FIG. 2 is a side elevational view of the punch pliers device of FIG. 1 in a second disposition thereof.
Figure 3:
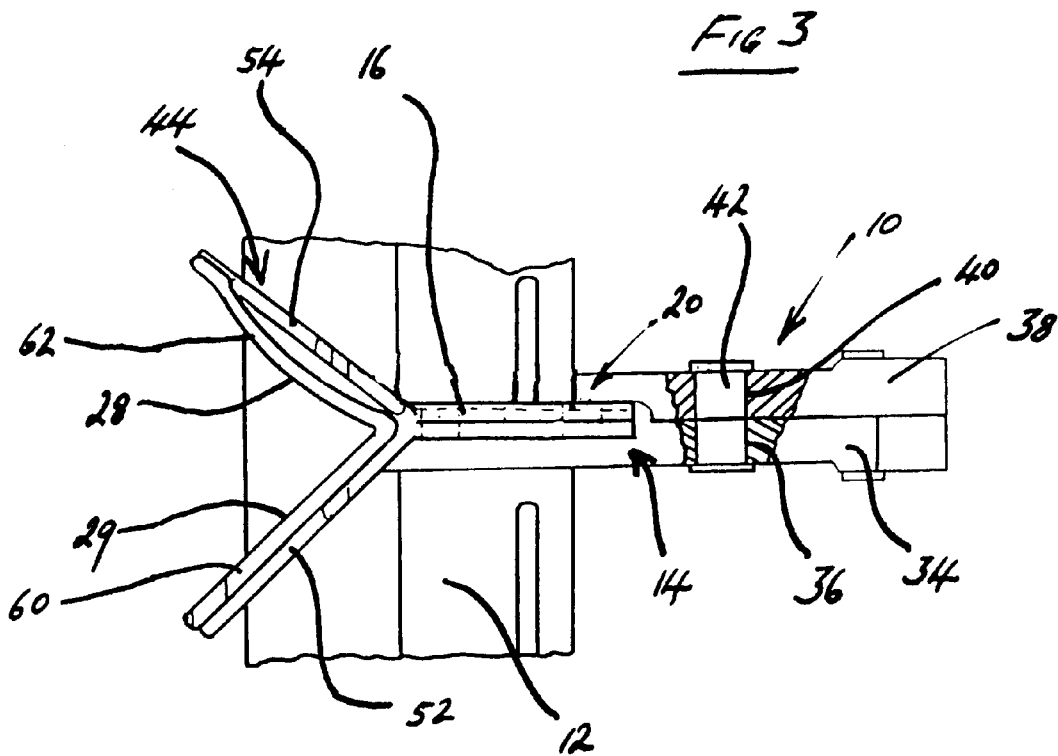
FIG. 3 is a view partially in section taken on the line 3—3 of FIG. 2.

FIG. 3 is a view taken on the line 3—3 of FIG. 2. As shown in FIGS. 2 and 3, the first arm 16 and the second limb 24 are bifurcated such that when the members 14 and 20 are pivoted to the second disposition thereof as shown in FIG. 2, the first arm 16 and the second limb 24 cut through the J-channel 12 with cuts 28 and 29 that are disposed generally angularly relative to each other.

Figure 4:
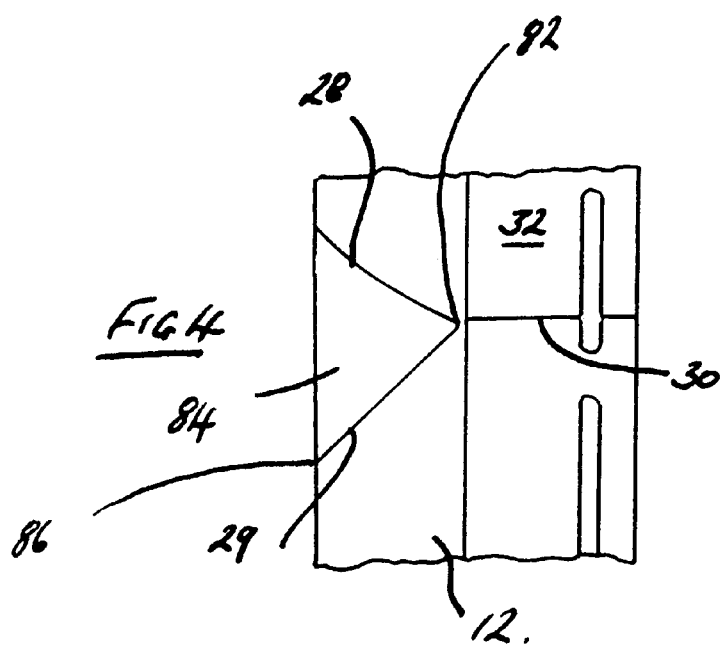
FIG. 4 is a similar view to that shown in FIG. 3 with the punch pliers device removed to show three of the J-channel cuts.

FIG. 4 is a view similar to that shown in FIG. 3 but with the punch pliers device 10 removed to show the first curved or arc shaped cut 28, a second cut 29 and a third cut 30 which is cut in a fastening portion 32 of the J-channel 12.

More particularly, as shown in FIG. 1, the first member 14 further includes a base portion 34 defining a hole 36. The second member 20 also includes a main portion 38 defining an aperture 40 as shown in FIG. 3, the aperture 40 and the hole 36 being aligned relative to each other. A pivot pin 42 extends through the hole 36 and the aperture 40 for permitting the members 14 and 20 to pivot relative to each other.

Figure 5:
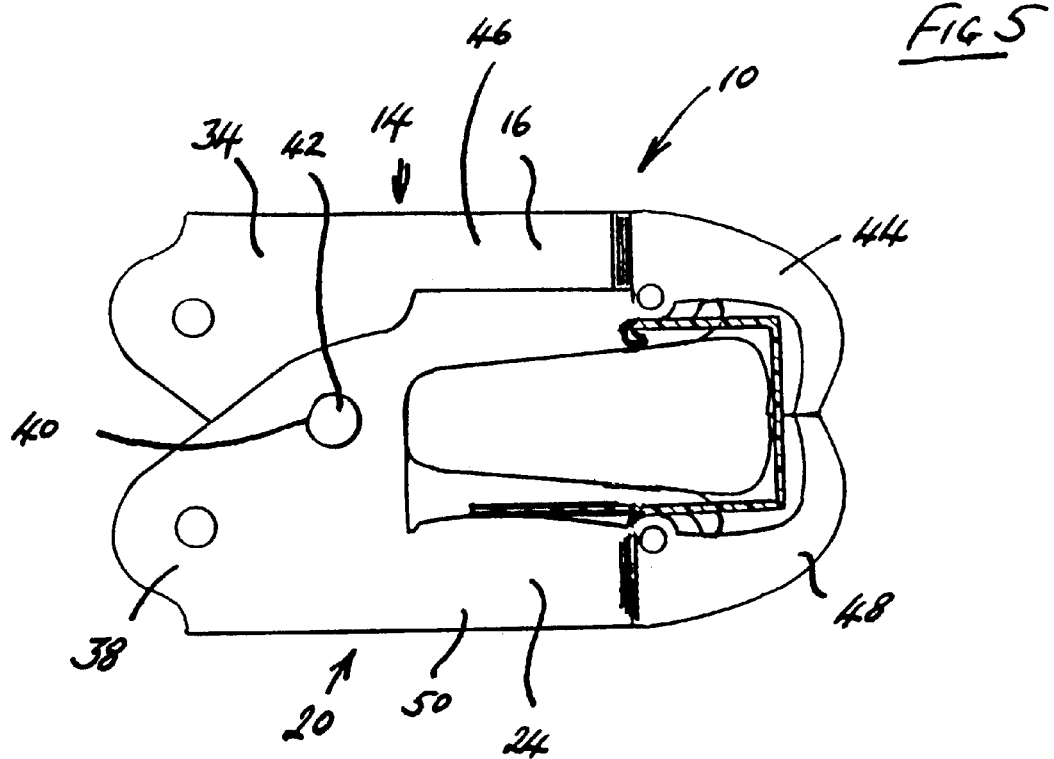
FIG. 5 is a side elevational view of the punch pliers device shown in FIG. 2 but viewed from the opposite side relative to FIG. 2.

FIG. 5 is a side elevational view of the punch pliers device 10 shown from the opposite side relative to FIG. 2. As shown in FIG. 5, the first arm 16 extends from the base portion 34 and includes, a distal portion 44 and a proximal portion 46 disposed between the distal portion 44 and the base portion 34. The second limb 24 extends from the main portion 38 and includes an extremity portion 48 and an intermediate portion 50 disposed between the extremity portion 48 and the main portion 38.

As shown in FIG. 3, the distal portion generally designated 44 is bifurcated and includes a first and a second curved portion 52 and 54 respectively.

The first member 14 further includes a first and second cutting blade 60 and 62 respectively secured to the first and second curved portion 52 and 54 respectively.

Figure 6:
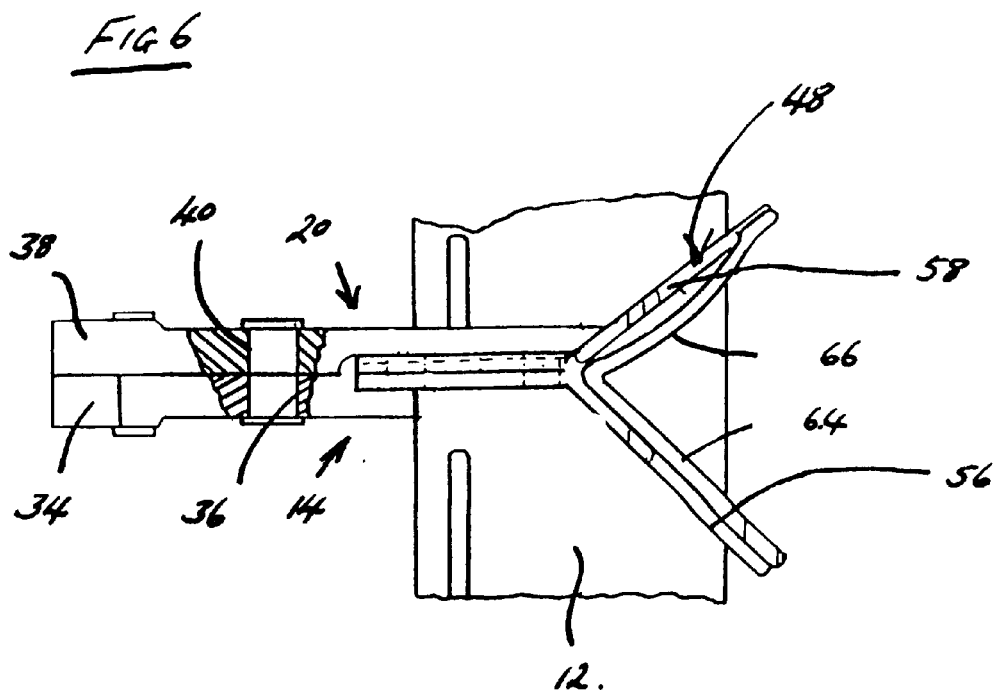
FIG. 6 is a similar view to that shown in FIG. 3 but shows the punch pliers device from the opposite side relative to FIG. 3.

FIG. 6 is a view similar to that shown in FIG. 3 but viewed from the opposite side relative to FIG. 3. FIG. 6 shows the extremity portion generally designated 48 as bifurcated, the extremity portion 48 including a first and a second backing portion 56 and 58 respectively.

The second member 20 further includes a first and second shear element 64 and 66 secured to the first and second backing portions 56 and 58 respectively.

More specifically, the second cutting blade 62 shown in FIG. 3 and the second shear element 66 shown in FIG. 6 are curved or arc shaped.

The second arm 18 as shown in FIG. 1 includes a hook portion 68 and the first limb 22 includes a hook shaped portion 70, the hook portion 68 and the hook shaped portion 70 being disposed within the J-channel 12 when the device 10 is disposed in the first disposition thereof. The hook portion 68 and the hook shaped portion 70 support the J-channel 12, the hook portion 68 and the hook shaped portion 70 urging the J-channel 12 towards the second limb 24 and the first arm 16 respectively when the members 14 and 20 are pivoted towards the second disposition thereof as shown in FIG. 2.

More particularly, the hook portion 68 urges the J-channel 12 towards the first and second shear elements 64 and 66 and the hook shaped portion 70 urges the J-channel 12 towards the first and second cutting blades 60 and 62 respectively when the members 14 and 20 are moved from the first towards the second disposition thereof for cutting through the J-channel 12.

The second arm 18 also includes means 72 for cutting through the fastening portion 32 of the J-channel 12. The first limb 22 further includes a further means 74 for cutting through the fastening portion 32 of the J-channel 12 when the J-channel is being used for a reverse bend.

The intermediate portion 50 further includes an anvil 76 which co-operates with the means 72 for cutting and the proximal portion 46 further includes a further anvil 78 which co-operates with the further means 74 for cutting.

Figure 7:
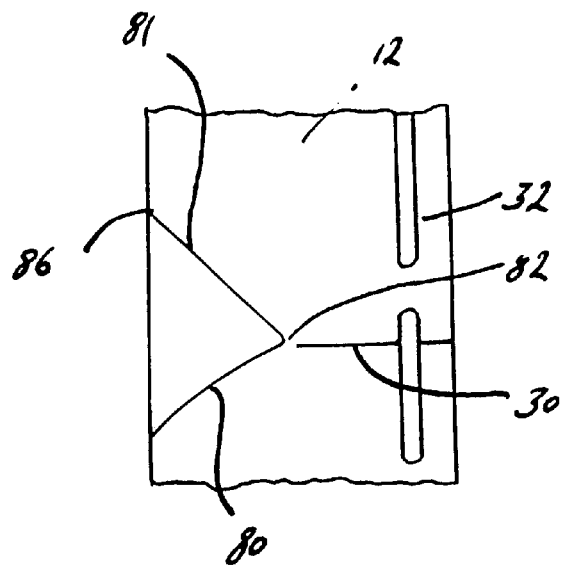
FIG. 7 is a similar view to that shown in FIG. 6 but with the punch pliers device removed to show the further cuts made in the J-channel.

Conventional handle means (not shown) are pivotally secured to the base and main portions 34 and 38 respectively for pivoting the members 14 and 20 relative to each other to snip the J-channel with cuts 28, 29 and 30 as shown in FIG. 4 and with further cuts 80 and 81 as shown in FIG. 7 which shows the cut J-channel from the opposite side relative to FIG. 4.

Thus, by a single operation of the punch pliers device, the five cuts 28, 29, 30, 80 and 81 are simultaneously made in the J-channel.

Subsequently, as shown in FIG. 8, the J-channel is bent about the juncture 82 of the cuts 28, 29 and 30 as shown in FIG. 4 until the curved or arc shaped cut 28 is disposed beneath the cut 29 as viewed in FIGS. 4 and 8.

Additionally, the tab 84 is pivoted about joint 86 and is disposed within the J-channel 12 as shown in phantom outline in FIG. 8 in order to lock the resultant mitered joint around the window frame 88.

In a preferred embodiment of the present invention as shown in FIGS. 9 and 10, a punch pliers device generally designated 110 is provided for cutting J-channel 112 used for fastening siding around an opening defined by a building. The device 110 includes a first elongate cutting member generally designated 114 for cutting the J-channel 112, the first member 114 having a first and a second end 116 and 118 respectively. Additionally, a second elongate cutting member generally designated 120 is provided for cutting the J-channel 112, the second member 120 having a first and a second extremity 122 and 124 respectively.

A yoke 126 extends between the cutting members 114 and 120, the yoke 126 having a first and a second side 128 and 130 respectively. The first side 128 of the yoke 126 is pivotally secured to the first cutting member 114 between the first and second end 116 and 118 of the first cutting member 114. The second side 130 of the yoke 126 is pivotally secured to the second cutting member 120 between the first and second extremity 122 and 124 of the second cutting member 120. The arrangement is such that when the first end 116 and the first extremity 122 are moved away from each other as indicated by arrows 132 and 134, the second end 118 and the second extremity 124 move towards each other as indicated by arrows 136 and 138.

A first cutting means generally designated 140 is secured to the first cutting member 114 adjacent to the second end 118 of the first cutting member 114 for cutting the J-channel 112 when the J-channel 112 is disposed between the second end 118 and the second extremity 124 as shown in FIG. 9.

A second cutting means generally designated 142 is secured to the second cutting member 120 adjacent to the second extremity 124 of the second cutting member 120 for cutting the J-channel 112 when the J-channel 112 is disposed between the second end 118 and the second extremity 124.

A first guide means generally designated 144 is pivotally secured to the first cutting member 114 between the first side 128 of the yoke 126 and the second end 118 of the first cutting member 114 for guiding the J-channel 112 towards the first cutting means 140.

Also, a second guide means generally designated 146 is pivotally secured to the second cutting member 120 between the second side 130 of the yoke 126 and the second extremity 124 of the second cutting member 120 for guiding the J-channel 112 towards the second cutting means 142.

More specifically, the first cutting member 114 includes a main portion 148 which extends from the first end 116. Also, a first and second bifurcated portion 150 and 152 respectively extend from the main portion 148 to the second end 118.

Figure 11:
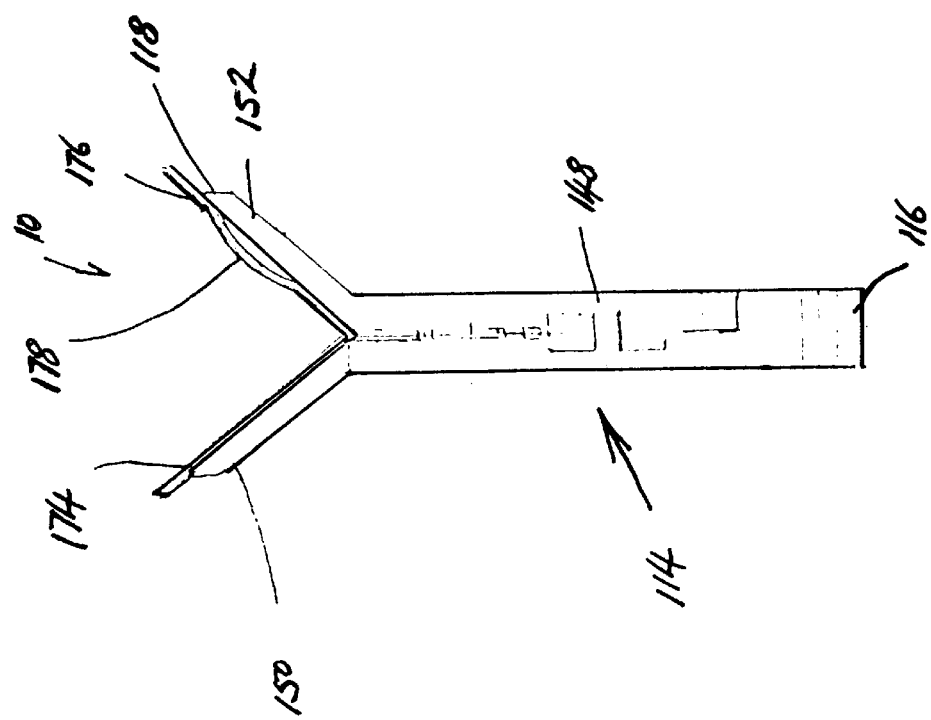
FIG. 11 is a left side view of the device shown in FIG. 9.

Additionally, as shown in FIG. 11 which is a left side view of the device 10 shown in FIG. 9, the main portion 148 defines a first, second and a third transverse bore 153, 154 and 155 respectively, the bores being disposed parallel relative to each other. A first, second and third pin 156, 157 and 158 respectively cooperate respectively with the first, second and third bores 153–155 such that the first bore 153 and first pin 156 permit leveraged movement of the first end 116 and extremity 122 away from each other. The second bore 154 and second pin 157 permit pivotal movement of the first cutting member 114 relative to the first side 128 of the yoke 126. The third bore 155 and third pin 158 permit pivotal movement of the first guide means 144 relative to the first cutting member 114. The first bore 153 is disposed adjacent to the first end 116 of the first cutting member 114, the second bore 154 being disposed between the first and the third bore 153 and 155 respectively.

Figure 12:
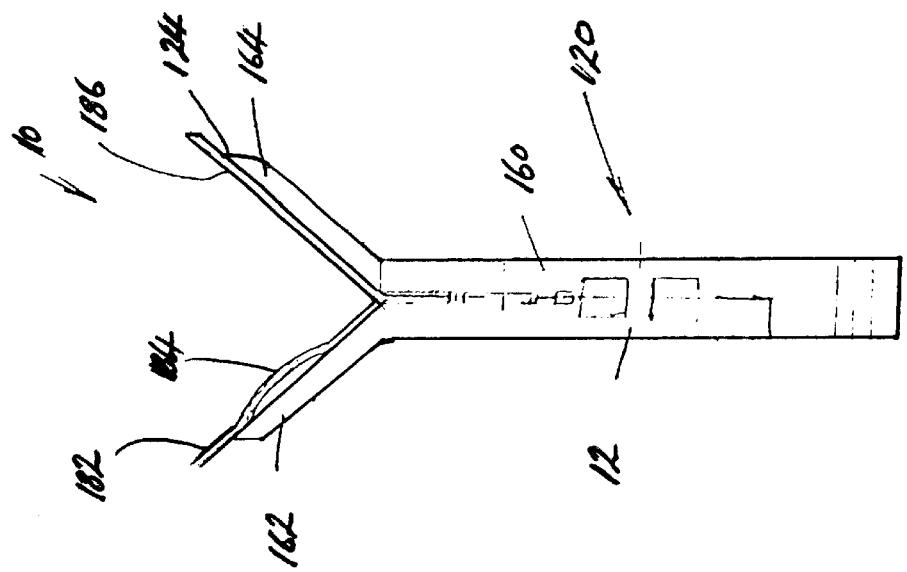
FIG. 12 is a right side view of the device shown in FIG. 9.

Also, as shown in FIG. 12 which is a right side view of the device 10 shown in FIG. 9, the second cutting member 120 includes a further main portion 160 which extends from the first extremity 122. A third and fourth bifurcated portion 162 and 164 respectively extend from the further main portion 160 to the second extremity 124.

The further main portion 160 defines a fourth, fifth and a sixth transverse bore 165, 166 and 167 respectively as shown in FIG. 10, the bores 165–167 being disposed parallel relative to each other. A fourth, fifth and sixth pin 168, 169 and 170 cooperate respectively with the fourth, fifth and a sixth bores 165–167 such that the fourth bore 165 and fourth pin 168 permit leveraged movement of the first end 116 and extremity 122 away from each other. The fifth bore 166 and fifth pin 169 permit pivotal movement of the second cutting member 120 relative to the second side 130 of the yoke 126. The sixth bore 167 and sixth pin 170 permit pivotal movement of the second guide means 146 relative to the second cutting member 120. The fourth bore 165 is disposed adjacent to the first extremity 122 of the second member 120, the fifth bore 166 being disposed between the fourth bore 165 and the sixth bore 167.

Preferably, the cutting members 114 and 120 are metal castings in which the first and fourth bores 153 and 165 are cast during a casting of each cutting member as shown in FIG. 13. Subsequently, the first and fourth bores 153 and 165 are removed from every alternate casting as shown in FIG. 14 so that opposed pairs of cutting members are generated.

The first cutting means 140 includes a first linear blade 172 secured to the first cutting member 114. Also, a first curved cutting blade 174 is secured to the first bifurcated portion 150 as shown in FIG. 11. Furthermore, a second curved cutting blade 176 having a convex surface 178 is secured to the second bifurcated portion 152.

Additionally, the second cutting means 142 includes a second linear blade 180 secured to the second cutting member 120.

Also, a third curved cutting blade 182 is secured to the third bifurcated portion 162, the blade 182 having a further convex surface 184 as shown in FIG. 12. Also, a fourth curved cutting blade 186 is secured to the fourth bifurcated portion 164.

Each of the linear blades 172 and 180 includes locating means 188 for permitting location and setting of the first linear blade 172 relative to the first cutting member 114 and the second linear blade 180 relative to the second cutting member 120.

Each of the curved blades 174, 176, 182 and 186 includes further locating means 190 for permitting location and setting of the first and second curved blade 174 and 176 relative to the first and second bifurcated portion 150 and 152 respectively and the third and fourth curved blade 182 and 186 relative to the third and fourth bifurcated portion 162 and 164 respectively.

The first guide means 144 includes a proximal and a distal end 192 and 194 respectively as shown in FIG. 10, the proximal end 192 being pivotally secured to the first cutting member 114. The distal end 194 is bifurcated as shown in FIG. 15 such that in use of the device, the bifurcated distal end 194 is disposed within the J-channel 112 for urging the J-channel 112 towards and into cutting engagement with the first cutting means 140.

Figure 16:
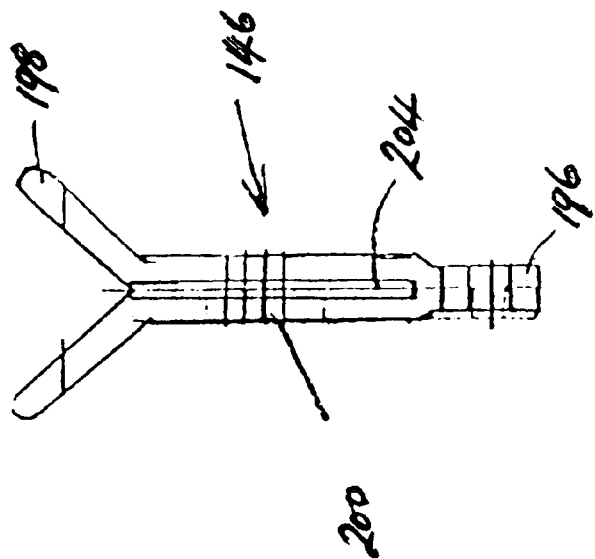
FIG. 16 as a side view of the second guide means of the device shown in FIG. 9.

Also, the second guide means 146 includes a further proximal and a further distal end 196 and 198 respectively as shown in FIG. 16. The further proximal end 196 is pivotally secured to the second cutting member 120. The further distal end 198 is bifurcated such that in use of the device 10, the further bifurcated distal end 198 is disposed within the J-channel 112 for urging the J-channel 112 towards and into cutting engagement with the second cutting means 142.

Pivotal means 200 extend through the first and second guide means 144 and 146. The pivotal means 200 are disposed between the proximal and distal ends 192,194 and 196,198 of the guide means for permitting the guide means to be pivotally connected to each other.

Figure 15:
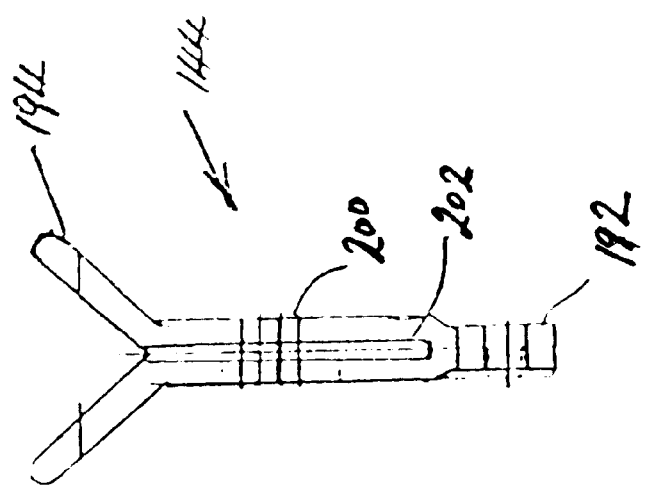
FIG. 15 is a side view of the first guide means of the device shown in FIG. 9.

Anvil means 202 as shown in FIGS. 9 and 15 is disposed between the proximal and the distal ends 192 and 194 respectively of the first guide means 144. The first linear cutter blade 172 is secured to the first cutting member 114, such that the first linear cutter blade 172 cooperates with the anvil means 202 for cutting the J-channel 112.

A further anvil means 204 shown in FIGS. 9 and 16 is disposed between the further proximal and the distal ends 196 and 198 of the second guide means 146. The second linear cutter blade 180 is secured to the second cutting member 120. The second linear cutter blade 180 cooperates with the further anvil means 204 for cutting the J-channel 112.

The present invention provides a unique tool that permits an operator to make a single snip and then bend a J-channel for making a mitered joint around a window or the like.

Another advantage of the present invention is that there is no wastage of materials because the cut tab is used to lock the mitered joint. Consequently, the time consuming step of cleaning Up cut portions of J-channel from the building site is avoided.

What is claimed is:

1. A punch pliers device for cutting J-channel used for fastening siding around
    an opening defined by a building, said device comprising:
    a first U-shaped member having a first and a second arm; and
    a second U-shaped member having a first and a second limb, said second member being pivotally secured to said first member such that in a first disposition of said members relative to each other, said second arm and said first limb are disposed adjacent to each other within the J-channel, said first arm and said second limb defining therebetween an opening for the reception therein of the J-channel and when said members are pivoted relative to each other to a second disposition thereof, one of said arms and one said limbs cut through the J-channel such that subsequent bending of the J-channel to fit around the opening is permitted.

2. A punch pliers device for cutting J-channel as set forth in claim 1 wherein;
    said first arm and said second limb are bifurcated such that when said members are pivoted to said second disposition thereof, said first arm and said second limb cut through said J-channel with cuts that are disposed generally angularly relative to each other.

3. A punch pliers device for cutting J-channel as set forth in claim 1 wherein;
    said first member further includes:
    a base portion defining a hole:
    said second member further includes:
    a main portion defining an aperture, said aperture and said hole being aligned relative to each other;
    a pivot pin extending through said hole and said aperture for permitting said members to pivot relative to each other.

4. A punch pliers device for cutting J-channel as set forth in claim 3 wherein;
    said first arm extends from said base portion;
    said first arm including:
    a distal portion;
    a proximal portion disposed between said distal portion and said base portion;
    said second limb extends from said main portion;
    said second limb including:
    an extremity portion;
    an intermediate portion disposed between said extremity portion and said main portion.

5. A punch pliers device for cutting J-channel as set forth in claim 4 wherein;
    said distal portion is bifurcated, said distal portion including:
    a first and a second curved portion;
    said extremity portion is bifurcated, said extremity portion including:
    a first and a second backing portion.

6. A punch pliers device for cutting J-channel as set forth in claim 5 wherein;
    said first member further includes:
    a first and second cutting blade secured to said first and second curved portion respectively.
    said second member further including:
    a first and second shear element secured to said first and second backing portions respectively.

7. A punch pliers device for cutting J-channel as set forth in claim 6 wherein;
    said second cutting blade and said second shear element are curved.

8. A punch pliers device for cutting J-channel as set forth in claim 6 wherein;
    said second arm includes:
    a hook portion;
    said first limb includes:

a hook shaped portion, said hook portion and said hook shaped portions being disposed within said J-channel when said device is in said first disposition thereof, said hook portion and said hook shaped portion supporting said J-channel, said hook portion and said hook shaped portion urging said J-channel towards said second limb and said first arm respectively when said members are pivoted towards said second disposition thereof;

said hook portion urging said J-channel towards said first and second shear elements and said hook shaped portion urging said J-channel towards said first and second cutting blades respectively when said members are moved from said first towards said second disposition thereof for cutting through said J-channel.

9. A punch pliers device for cutting J-channel as set forth in claim 4 wherein said second arm further includes:

edge means for cutting through a fastening portion of the J-channel;

said first limb further includes:

a further edge means for cutting through a fastening portion of the J-channel;

said intermediate portion further including:

an anvil which co-operates with said edge means for cutting;

said proximal portion further including:

a further anvil which co-operates with said further edge means for cutting.

10. A punch pliers device for cutting J-channel as set forth in claim 1 wherein;

said second arm includes:

a hook portion;

said first limb includes:

a hook shaped portion, said hook portion and said hook shaped portions being disposed within said J-channel when said device is in said first disposition thereof, said hook portion and said hook shaped portion supporting said J-channel, said hook portion and said hook shaped portion urging said J-channel towards said second limb and said first arm respectively when said members are pivoted towards said second disposition thereof.

11. A punch pliers device for cutting J-channel as set forth in claim 1 wherein;

said second arm further includes:

edge means for cutting through a fastening portion of said J-channel;

said first limb further includes:

a further edge means for cutting through a fastening portion of said J-channel.

12. A punch pliers device for cutting J-channel used for fastening siding around an opening defined by a building, said device comprising:

a first elongate cutting member for cutting the J-channel, said first member having a first and a second end;

a second elongate cutting member for cutting the J-channel, said second member having a first and a second extremity;

a yoke extending between said cutting members, said yoke having a first and a second side, said first side being pivotally secured to said first cutting member between said first and second end of said first cutting member, said second side being pivotally secured to said second cutting member between said first and second extremity of said second cutting member, the arrangement being such that when said first end and said first extremity are moved away from each other, said second end and said second extremity move towards each other;

a first cutting means secured to said first cutting member adjacent to said second end of said first cutting member for cutting the J-channel when the J-channel is disposed between said second end and said second extremity;

a second cutting means secured to said second cutting member adjacent to said second extremity of said second cutting member for cutting the J-channel when the J-channel is disposed between said second end and said second extremity;

first guide means (144) having a proximal end (192) and a distal end (194), said proximal end (192) being pivotally secured to said first cutting member (114) between said first side (128) of said yoke (126) and said second end (118) of said first cutting member (114), said distal end (194) being disposed within the J-channel (112) for guiding the J-channel (112) towards said first cutting means (140); and second guide means (146) having a further proximal end (196) and a further distal end (198), said further proximal end (196) being pivotally secured to said second cutting member (120) between said second side (130) of said yoke (126) and said second extremity (124) of said second cutting member (120), said further distal end (198) being disposed within the J-channel (112) for guiding the J-channel (112) towards said second cutting means (142).

13. A punch pliers device as set forth in claim 12 wherein said first cutting member includes;

a main portion extending from said first end;

a first and second bifurcated portion extending from said main portion to said second end.

14. A punch pliers device as set forth in claim 13 wherein said main portion defines a first, second and a third transverse bore, said bores being disposed parallel relative to each other;

a first, second and third pin cooperating respectively with said first, second and third bores such that said first bore and first pin permit leveraged movement of said first end and extremity away from each other, said second bore and second pin permit pivotal movement of said first cutting member relative to said first side of said yoke, said third bore and third pin permit pivotal movement of said first guide means relative to said first cutting member, said first bore being disposed adjacent to said first end of said first cutting member, said second bore being disposed between said first and said third bore.

15. A punch pliers device as set forth in claim 13 wherein said second cutting member includes;

a further main portion extending from said first extremity;

a third and fourth bifurcated portion extending from said further main portion to said second extremity.

16. A punch pliers device as set forth in claim 15 wherein said further main portion defines a fourth, fifth and a sixth transverse bore, said bores being disposed parallel relative to each other;

a fourth, fifth and sixth pin cooperating respectively with said fourth, fifth and a sixth bores such that said fourth bore and fourth pin permit leveraged movement of said first end and extremity away from each other, said fifth bore and fifth pin permit pivotal movement of said second cutting member relative to said second side of said yoke, said sixth bore and sixth pin permit pivotal movement of said second guide means relative to said second cutting member, said fourth bore being disposed adjacent to said first extremity of said second member, said fifth bore being disposed between said fourth and said sixth bore.

17. A punch pliers device as set forth in claim 16 wherein said first and fourth bores are formed during a casting of each cutting member, said first and fourth bores being snapped off from every alternate casting so that opposed pairs of cutting members are generated.

18. A punch pliers device as set forth in claim 13 wherein said cutting members are metal castings.

19. A punch pliers device for cutting J-channel used for fastening siding around an opening defined by a building, said device comprising:

a first elongate cutting member for cutting the J-channel, said first member having a first and a second end;

a second elongate cutting member for cutting the J-channel, said second member having a first and a second extremity;

a yoke extending between said cutting members, said yoke having a first and a second side, said first side being pivotally secured to said first cutting member between said first and second end of said first cutting member, said second side being pivotally secured to said second cutting member between said first and second extremity of said second cutting member, the arrangement being such that when said first end and said first extremity are moved away from each other, said second end and said second extremity move towards each other;

a first cutting means secured to said first cutting member adjacent to said second end of said first cutting member for cutting the J-channel when the J-channel is disposed between said second end and said second extremity;

a second cutting means secured to said second cutting member adjacent to said second extremity of said second cutting member for cutting the J-channel when the J-channel is disposed between said second end and said second extremity;

first guide means pivotally secured to said first cutting member between said first side of said yoke and said second end of said first cutting member for guiding the J-channel towards said first cutting means;

second guide means pivotally secured to said second cutting member between said second side of said yoke and said second extremity of said second cutting member for guiding the J-channel towards said second cutting means;

said first cutting member including;

a main portion extending from said first end;

a first and second bifurcated portion extending from said main portion to said second end;

said second cutting member including;

a further main portion extending from said first extremity;

a third and fourth bifurcated portion extending from said further main portion to said second extremity;

said first cutting means including:

a first linear blade secured to said first cutting member;

a first curved cutting blade secured to said first bifurcated portion;

a second curved cutting blade secured to said second bifurcated portion;

said second cutting means including:

a second linear blade secured to said second cutting member;

a third curved cutting blade secured to said third bifurcated portion; and a fourth curved cutting blade secured to said fourth bifurcated portion.

20. A punch pliers device as set forth in claim 19 wherein each of said linear blades includes;

locating means for permitting location and setting of said first linear blade relative to said first cutting member and said second linear blade relative to said second cutting member;

each of said curved blades includes;

further locating means for permitting location and setting of said first and second curved blade relative to said first and second bifurcated portion respectively and said third and fourth curved blade relative to said third and fourth bifurcated portion respectively.

21. A punch pliers device for cutting J-channel used for fastening siding around an opening defined by a building, said device comprising:

a first elongate cutting member for cutting the J-channel, said first member having a first and a second end;

a second elongate cutting member for cutting the J-channel, said second member having a first and a second extremity;

a yoke extending between said cutting members, said yoke having a first and a second side, said first side being pivotally secured to said first cutting member between said first and second end of said first cutting member, said second side being pivotally secured to said second cutting member between said first and second extremity of said second cutting member, the arrangement being such that when said first end and said first extremity are moved away from each other, said second end and said second extremity move towards each other;

a first cutting means secured to said first cutting member adjacent to said second end of said first cutting member for cutting the J-channel when the J-channel is disposed between said second end and said second extremity;

a second cutting means secured to said second cutting member adjacent to said second extremity of said second cutting member for cutting the J-channel when the J-channel is disposed between said second end and said second extremity;

first guide means pivotally secured to said first cutting member between said first side of said yoke and said second end of said first cutting member for guiding the J-channel towards said first cutting means;

second guide means pivotally secured to said second cutting member between said second side of said yoke and said second extremity of said second cutting member for guiding the J-channel towards said second cutting means;

said first guide means including:

a proximal and a distal end, said proximal end being pivotally secured to said first cutting member, said distal end being bifurcated such that in use of the device, said bifurcated distal end is disposed within the J-channel for urging the J-channel towards and into cutting engagement with said first cutting means;

said second guide means includes:

a further proximal and a further distal end, said further proximal end being pivotally secured to said second cutting member, said further distal end being bifurcated such that in use of the device, said further bifurcated distal end is disposed within the J-channel for urging the J-channel towards and into cutting engagement with said second cutting means.

22. A punch pliers device as set forth in claim 21 further including:

pivotal means extending through said first and second guide means and disposed between said proximal and distal ends of said guide means for permitting said guide means to be pivotally connected to each other;

anvil means disposed between said proximal and said distal ends of said first guide means;

a first linear cutter blade secured to said first cutting member, said first linear cutter blade cooperating with said anvil means for cutting the J-channel;

further anvil means disposed between said further proximal and said distal ends of said second guide means;

second linear cutter blade secured to said second cutting member, said second linear cutter blade cooperating with said further anvil means for cutting the J-channel.

* * * * *